United States Patent
McDaniel et al.

(10) Patent No.: US 7,002,321 B2
(45) Date of Patent: *Feb. 21, 2006

(54) AUTOMATIC POWER FACTOR CORRECTION USING POWER MEASUREMENT CHIP

(76) Inventors: William D. McDaniel, 709 NE. Lindberg Dr., Oakview, MO (US) 64118; Gail A. McDaniel, 806 NE. Maple Dr., Oakview, MO (US) 64118; Timothy J. McDaniel, 808 NE. Maple Dr., Oakview, MO (US) 64118

( * ) Notice: Subject to any disclaimer, the term of this patent is extended or adjusted under 35 U.S.C. 154(b) by 40 days.

This patent is subject to a terminal disclaimer.

(21) Appl. No.: 10/789,253

(22) Filed: Feb. 27, 2004

(65) Prior Publication Data

US 2004/0164718 A1 Aug. 26, 2004

Related U.S. Application Data

(63) Continuation-in-part of application No. 10/162,406, filed on Jun. 4, 2002, now Pat. No. 6,700,358, which is a continuation-in-part of application No. 09/874,690, filed on Jun. 5, 2001, now Pat. No. 6,462,519.

(51) Int. Cl.
G05F 1/70 (2006.01)
(52) U.S. Cl. .................................... 323/211
(58) Field of Classification Search ............... 323/205, 323/207, 208, 209, 210, 211
See application file for complete search history.

(56) References Cited

U.S. PATENT DOCUMENTS

| 5,736,838 A | 4/1998 | Dove et al. |
| 4,055,795 A | 10/1977 | Mathieu |
| 4,204,150 A | 5/1980 | Mathieu |
| 4,321,529 A | 3/1982 | Simmonds et al. |
| 4,359,678 A | 11/1982 | Raivola et al. |
| 4,417,196 A | 11/1983 | Cueto et al. |
| 4,645,997 A | 2/1987 | Whited |
| 4,651,265 A | 3/1987 | Stacey et al. |
| 4,771,225 A | 9/1988 | Nishikawa |
| 4,891,569 A | 1/1990 | Light |
| 5,461,303 A | 10/1995 | Leman et al. |
| 5,541,498 A | 7/1996 | Beckwith |

(Continued)

OTHER PUBLICATIONS

Analog Devices, Inc., ADE 7753 Data sheet, 2003 (www.analog.com) pp1-48, Analog Devices, Inc., USA.

(Continued)

*Primary Examiner*—Adolf Berhane
(74) *Attorney, Agent, or Firm*—Shughart Thomson & Kilroy, P.C; Dennis A. Crawford; Marcia J. Rodgers

(57) ABSTRACT

An automatic power factor correction system, for an electrical power installation drawing varying levels of reactive power, measures an electrical parameter of the power drawn by a load of a power installation using a power measurement integrated circuit, the parameter being capable of indicating a level of reactive power drawn by the load, and couples a combination of capacitors to the power line to compensate for the level of reactive power indicated by the electrical parameter measured. In a first embodiment of the invention, the combination of power factor compensating capacitors is calculated from a signed value of reactive power drawn by the load. In a second embodiment, the compensating capacitor combination is calculated from a value of power factor for the load which is calculated from a ratio of an active power value to an apparent power value.

20 Claims, 5 Drawing Sheets

U.S. PATENT DOCUMENTS

| | | |
|---|---|---|
| 5,751,138 A | 5/1998 | Venkata et al. |
| 6,072,302 A | 6/2000 | Underwood et al. |
| 6,462,519 B1 | 10/2002 | McDaniel et al. |
| 6,700,358 B1 * | 3/2004 | McDaniel et al. .......... 323/211 |

OTHER PUBLICATIONS

Cirrus Logic, Inc., CS5460A Data sheet, Jan. 2003 (www.cirrus.com), pp 1-53, Cirrus Logic, Inc., USA.

* cited by examiner

AUTOMATIC POWER FACTOR CORRECTION USING POWER MEASUREMENT CHIP

CROSS-REFERENCE TO RELATED APPLICATIONS

This is a continuation-in-part of U.S. patent application, Ser. No. 10/162,406 for AUTOMATIC POWER FACTOR CORRECTION SYSTEM filed Jun. 4, 2002, now U.S. Pat. No. 6,700,358, which is a continuation-in-part of U.S. patent application, Ser. No. 09/874,690 for AUTOMATIC POWER FACTOR CORRECTION SYSTEM filed Jun. 5, 2001, now U.S. Pat. No. 6,462,519, both applications being incorporated herein by reference.

BACKGROUND OF THE INVENTION

The present invention relates to electrical power control circuitry and, more particularly, to an improved system for monitoring and correcting the power factor of a power installation which employs a power measurement integrated circuit.

Electrical power is an enormously versatile and convenient source of energy. However, there are costs in generating and distributing electrical energy, which tend to increase when demand for electrical power increases. For this reason, there is always a motivation for increasing the efficiency of electrical power transmission and utilization and, conversely, for reducing losses and wastes in the delivery and use of electrical energy.

Alternating current electrical power is characterized by a phase relationship between the current and voltage. Current phase lagging the voltage phase results from a preponderance of inductive loads, while current phase leading the voltage phase results from capacitive loads. An in-phase relationship results from resistive loads or a balance of inductive and capacitive loads. In-phase current results in "real" or resistive power, also known as active power, while out-of-phase current results in reactive power from the influence of inductive or capacitive reactance in the power circuit. The vector sum of active power and reactive power is called apparent power. In a single phase AC system, the angle between the active power and the apparent power is the same as the phase angle between the voltage and current. A commonly used measure of the phase relationship between current and voltage is power factor, which is equal to the cosine of the phase angle therebetween or between the active power and the apparent power. Power factor maximizes at a value of unity when the relationship is effectively resistive, is positive and less than one when inductive, and is negative and less than one when capacitive.

In practice, there tend to be more types of inductive loads, such as electric motors, transformers, and the like, connected to power lines than capacitive. In residential power installations, the majority of electrical energy consumed is in refrigeration, ventilation, air conditioning, lighting, and, in some cases, heating. Relatively small amounts of energy are also used for communications, computers, entertainment devices, and the like. Although reactive power is not "consumed" as such in useful work, it is delivered to the power system and returned to the generator. For this reason, there are energy losses associated with the delivery of reactive power, from resistive losses and from currents that are inductively and capacitively coupled away from power conductors. Thus, the delivery of reactive power affects the cost of power generation. Power companies often impose surcharges on industrial power customers when their loads drive the power factor below a selected level. To avoid this, industrial users often connect power factor correcting capacitors to the power line along with their inductive loads to compensate and retain the power factor at an economic level.

While there are power factor correcting systems available for large industrial power users, there have been few practical or economical devices for correcting power factors of residential and small business customers. Generally, industrial power factor correcting systems are associated with the equipment for which they are intended to compensate and are activated in coordination with such equipment. In the past, it has not been considered practical or economical for owners of residential property to install power factor correction devices for each possible inductive load. Additionally, inductive devices in residences tend to be activated at random times, for example, under the control of thermostats.

There is a type of integrated circuits or chips referred to as power or energy measurement circuits which have been developed principally for use in solid state power meters for measuring power consumption by electrical utility customers. Such chips measure a number of parameters associated with the flow of AC electrical energy from a source to a customer's electrical installation, including parameters which indicate levels of reactive power or energy drawn by an installation. However, apparatus or methods using such chips to compensate for reactive power drawn for power factor correction purposes are not known to have been previously developed.

SUMMARY OF THE INVENTION

The present invention provides a system for correcting the power factor of relatively small power installations, such as residences, apartments, small businesses, and also individual appliances, such as refrigerators, air conditioners, heat pumps, dish washers, laundry washers and dryers, and the like. The system of the present invention generally includes a plurality of reactance units or capacitors which are selectively coupled to a power line and sensor circuitry to determine if the capacitors connected to the power line have favorably affected the power factor.

In general, the present invention measures an electrical parameter of the power drawn by a load of a power installation which is capable of indicating a level of reactive power drawn by the load and couples a combination of reactance elements to the power line to substantially compensate for the level of reactive power indicated by the electrical parameter measured. The present invention employs power or energy measurement integrated circuits or chips in power sensor circuitry, coupled either to the power line or to a load connectable to the power line, to derive reactive power indicating parameters from voltage and current measurements on the power line. The invention is directed to a first embodiment in which the power measurement chip provides a reactive power value having a positive or negative sign to indicate an inductive or capacitive power value, which is derived from periodic measurements of power line voltage and load current. In the first embodiment, a controller or microprocessor periodically acquires the signed reactive power value from the power measurement chip and calculates a combination of capacitance values to compensate for the reactive power level drawn by the load on the power line and controls the switching of the capacitance combination across the power line. The measurements by the power measurement chip and the reactive power value acquisitions by the controller are periodically repeated so that as the power drawn by the load or loads changes, the compensating values of capacitance are adjusted accordingly.

In a second embodiment of the present invention, a power measurement chip periodically derives values of active power and apparent power from voltage and current measurements. The controller periodically acquires the values of active power and apparent power and derives a power factor value from the ratio of active power to apparent power. The controller then calculates a combination of capacitance values to maximize the power factor value, to compensate for the level of reactive power drawn, and controls the switching of the capacitance combination across the power line. In the second embodiment, current sensing circuitry is placed in a circuit branch which includes the load and which is in parallel with the compensating capacitors. By this means, load current measured by the current sensing circuitry is not affected by compensating capacitors which might already connected across the power line or which might be excessive because of a change in operation of the load. The controller in the second embodiment simply calculates the most appropriate capacitance combination to compensate for the currently derived value of power factor, regardless of the previously calculated capacitance combination.

In measuring the reactive power indicating parameters of power drawn by loads within the power installation, the present invention may average a number of measurements over time and takes no compensation action unless a change of a selected difference is measured in less than a selected interval of time. This approach, thus, reduces switching transients by making the system relatively immune to small variations in the power drawn.

In the preferred embodiments, the present invention bases compensating capacitance increments on multiples of a base capacitance which would result in a compensating reactance that would draw about one ampere of current at the nominal power line frequency and voltage. The base capacitance is 22 microfarads for a power installation with a line frequency of 60 hertz and a nominal voltage of 110 volts. The set of capacitors includes capacitors with capacitance values: 1, 2, 4, 8 . . . 128 times the base capacitance. A typical installation of the present invention includes a set of eight compensating capacitors with values ranging in powers of two from 1 to 128 times the base capacitance of 22 microfarads.

The compensating capacitors are connected through latching switches across the power line. The latching switches are interfaced to an eight-bit output port of a controller, such as a microprocessor or microcontroller. By this means, the controller can connect any one of 256 combinations of the capacitors across the power line or disconnect any or all of the capacitors from the power line by writing an appropriate binary word to the output port in which the bit content of the binary word corresponds to the combination of capacitors to be connected or disconnected.

Other objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

Figure 1:
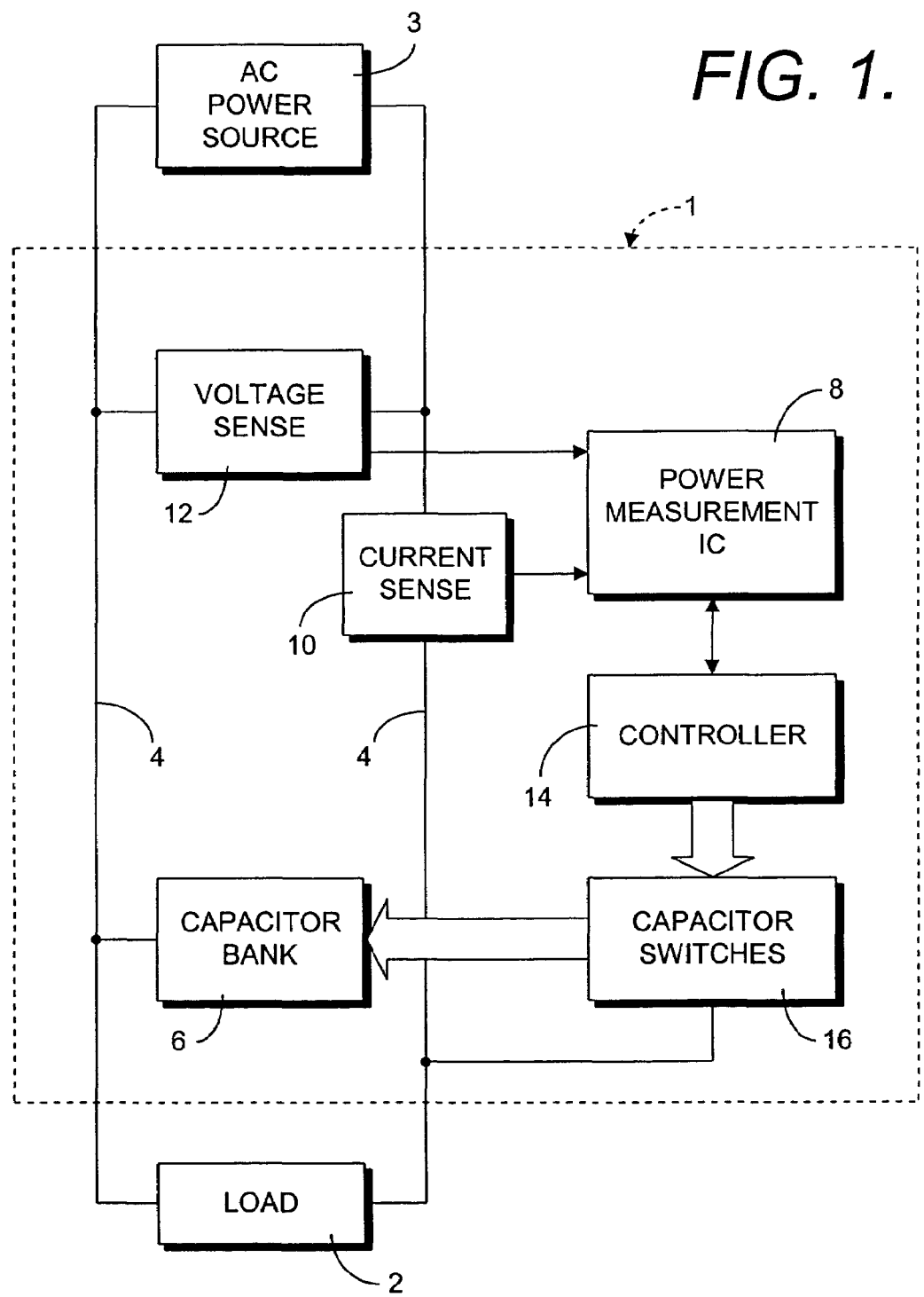
FIG. 1 is a block diagram illustrating the principal components of an automatic power factor correction system using a power measurement chip which embodies the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a power factor correction apparatus for automatically correcting the power factor of a power installation including one or more power loads drawing a variable level of reactive power at random times from an AC power source 3, such as a generator of an electrical utility company, by way of a power line 4. In general, the present invention measures a one or more electrical parameters of the power drawn by the load 2 which are capable of indicating a level of reactive power drawn by the load and controls the coupling of an appropriate combination of reactance elements 6, such as capacitors, to the power line 4 to substantially compensate for the level of reactive power indicated by the electrical parameter measured. In the present invention, the electrical parameters of the drawn power are measured by way of a power measurement integrated circuit (IC) or chip 8.

The power factor correction apparatus 1 includes current sensing circuitry 10 coupled into one of the conductors of the power line 4 and voltage sensing circuitry 12 coupled across the power line. The current and voltage sensing circuitry 10 and 12 are coupled to inputs of the power measurement chip 8 which periodically derives values of electrical parameters from the measured current and voltage and stores values of such parameter values in registers within the chip 8. The apparatus 1 includes a controller 14, such as a microprocessor, which is programmed to periodically query the chip 8 for selected ones of the parameter values to employ in calculations to determine the appropriate combination of capacitors 6 to couple to the power line 4 to compensate for reactive power drawn by the load 2. The controller 14 controls capacitor switching circuitry 16 to connect the selected capacitor combination across the power line 4 to improve the power factor of the load 2, as it would be sensed or "seen" by the power source 3.

Figure 2:
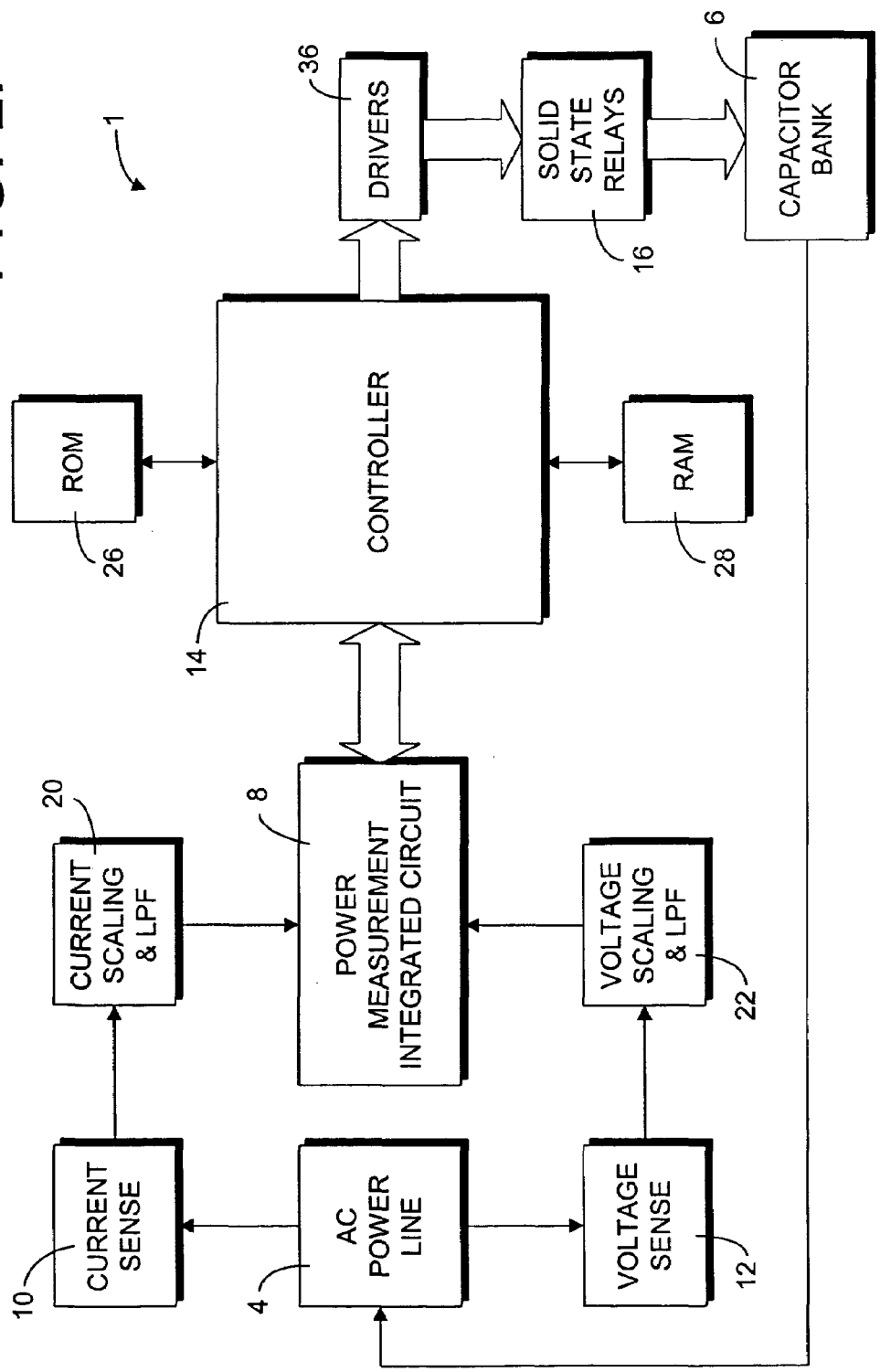
FIG. 2 is a more detailed block diagram illustrating further details of the automatic power factor correction system.

Referring to FIGS. 1 and 2, the current sensing circuitry 10 preferably includes a transformer or coil (not shown) which is connected or inductively coupled to one conductor of the power line 4. The current sensing circuitry 10 could alternatively be formed by a resistor or other type of element, such as a Hall effect based sensor. The signal from the current sensing circuitry 10 is coupled to the power measurement chip 8 by way of signal conditioning circuitry 20 which includes scaling elements, such as a resistor network (not shown) and low pass filtering elements, such as a capacitor network (not shown). Similarly, the voltage sensing circuitry 12 includes signal conditioning circuitry 22 including scaling components, such as a resistor network (not shown) and low pass filtering components, such as a capacitor network (not shown). The actual configuration of conditioning circuitry 20 and 22 depends on the range of signal levels required by the particular chip 8 employed.

The illustrated controller 14 includes ROM (read-only memory) 26 which stores programs and fixed data and RAM (read/write memory) 28 which stores temporary data. The ROM 26 may be an EPROM or other type of field programmable ROM or a mask programmed ROM. The RAM 28 may include flash RAM or other non-volatile type of memory circuitry. The controller 14 may be implemented by any of a number of known types of embedded microprocessors, microcontrollers, and the like. The controller 14 may, for example, be one of the PIC16F87X series of microcontrollers manufactured by Microchip Technology, Inc. (documentation for which can be found at www.microchip.com). The controller 14 includes a parallel port 32 (FIG. 3) which is interfaced through a set of drivers 36 and solid state relays or latching switches 16 to a plurality of capacitors 38 of the capacitor bank 6.

Figure 3:
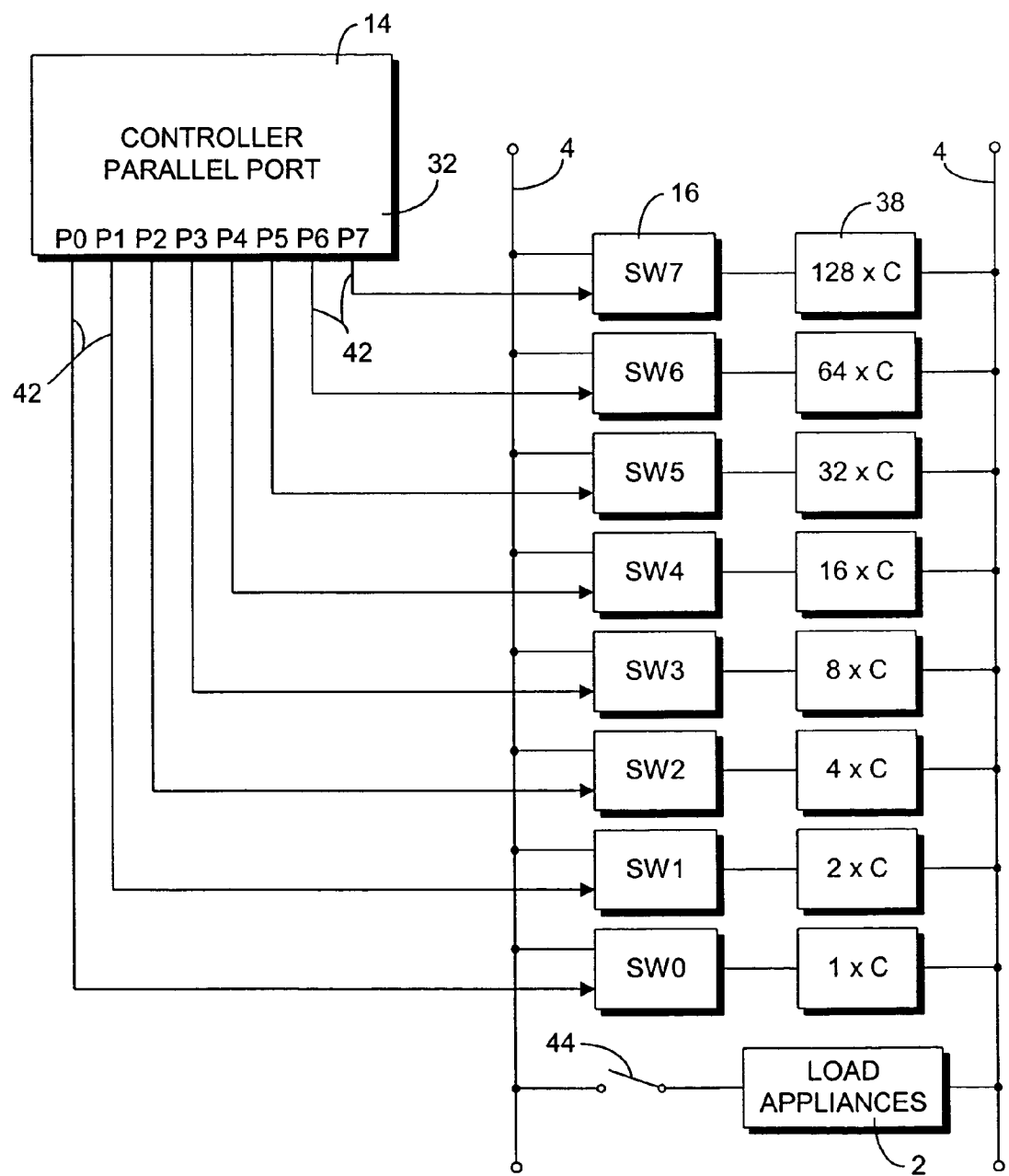
FIG. 3 is a block diagram illustrating a capacitor bank and switching circuitry of the automatic power factor correction system.

FIG. 3 illustrates details of the capacitor bank 6 and the manner of interfacing the capacitors 38 of the bank 6 to the port 32 of the controller 14. The port 32 is illustrated as having eight terminals 42 labeled P0 through P7. Each terminal 42 is connected through a latching switch 16 to a specific capacitor 38. The capacitors 38 are shown as having values (1×C) through (128×C), varying in powers of two or doubling. The value "C" is selected as the value of capacitance which will form a capacitive reactance which will draw approximately one ampere of current at the nominal line frequency and line voltage of the power line 4. The value of "C" is 22 microfarads for a line frequency of 60 hertz and a nominal AC line voltage of 110 volts. Alternatively, the value of "C" could be determined to draw some other value of current, such as one-half ampere, a quarter of an ampere, or the like, depending on the degree of correction resolution desired. In such a case, it would still be desirable to vary the values of capacitors 38 in the capacitor bank 6 by multiples of 2 for convenient binary switching control of the capacitors 38. Alternatively, additional ports 32 could be employed and a larger number of capacitors 38 used to provide for flexibility in the range and/or resolution of power factor correction in the present invention.

By use of such a set of capacitors 38, the compensation resolution of the apparatus 1 is one ampere of correction. The set of capacitors 38 in the illustrated capacitor bank 6, and activated in the matter illustrated in FIG. 3, can provide any capacitance value from zero to 255 times "C", in increments of "C". The controller 14 simply writes a binary word to the port 32 in which the binary content of the word corresponds to the capacitors 38 it has been determined require coupling to the power line 4. The drivers 36 provide isolation and driving current to operate the solid state relays 16, such as triacs, SCR's, or the like. The relays or switches 16, or the drivers 36, preferably have latching capability so that the most recent state of activation written to the port 32 is maintained until changed by a new word from the controller 14. The apparatus 1 may be set up to use either a positive logic, in which a logic one activates the switches 16, or a negative logic, in which a logic zero activates the switches 16.

Each set of a capacitor 38 and its latching switch 16 is connected across the power line 4. In a physical embodiment of the capacitor bank 6 shown, the sets of capacitors 38 with latching switches 16 can be connected in parallel and simply plugged into a convenient outlet connected to the power line 4. FIG. 3 shows load appliances 2 which are connected by respective appliance switches 44 to the power line 4. It is also foreseen that the apparatus 1 could be incorporated within an appliance 2 for providing power factor correction solely for that particular appliance rather than a plurality of appliances or a whole household.

The power measurement integrated circuit 8 is one of a type of integrated circuits which are also referred to as power measurement circuits, energy measurement circuits, power/energy metering circuits, or the like. They are provided by their manufactures principally for incorporation into power meters, such as those employed by electrical utility companies for metering electrical power usage and energy consumption by utility customers. Power measurement circuits with varying capabilities and specifications are manufactured by Analog Devices, Inc. (www.analog.com) and Cirrus Logic, Inc. (www.cirrus.com). Alternatively, comparable types of chips may be available from other manufacturers. Such chips incorporate sampling control circuitry, scaling circuitry, analog to digital conversion circuitry (ADC), storage registers, mathematical processing software, and data interfaces. Published specifications and application notes detail the manner of coupling such devices to power lines for measuring power line parameters and for interfacing to host systems for obtaining values of the parameters measured. In the present invention, the use of such types of chips reduces the complexity of the apparatus 1 and increases the flexibility of design and use of the apparatus 1.

In a preferred or first embodiment of the apparatus 1, the chip 8 is a model ADE7753 manufactured by Analog Devices, Inc. Documentation for this chip is available on the website identified above. The ADE7753 periodically derives a signed reactive power value, among other parameters, from the voltage and current values measured through the current and voltage sensing circuitry 10 and 12 and stores this value in a particular register within the chip 8 which can be queried by the controller 14, over a serial interface between the chip 8 and the controller 14. From the signed reactive power value, the controller 8 can calculate the value of capacitance required to compensate for the reactive component of power drawn by the load 2, using known formulas. From the known voltage of the power line 4, or a measured voltage value stored in an appropriate register, and the measured reactive power, the reactive current drawn by the load 2 can be calculated, along with the reactive impedance or reactance of the load 2. The compensating reactance is numerically the same as the load reactance with the opposite sign, from which the required compensating capacitor combination can be calculated. It is foreseen that there are other ways to determine the compensating capacitance value from the signed reactive power value, either in combination with known factors or with other parameters derived by the particular chip 8.

Figure 4:
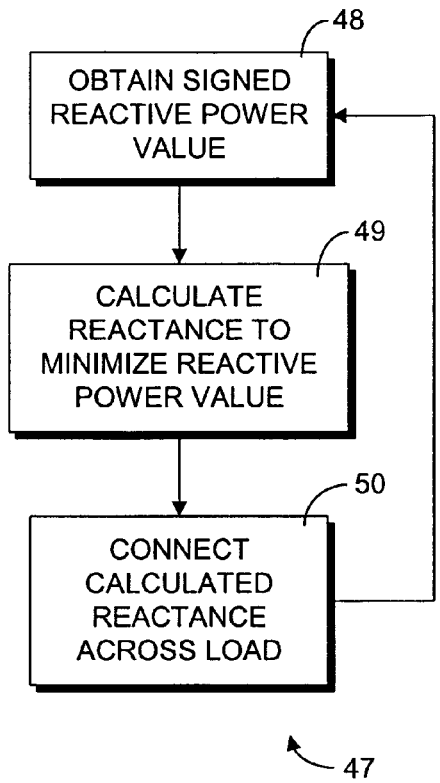
FIG. 4 is a flow diagram illustrating the principal process steps of the present invention for correcting power factor based on acquisition of a signed reactive power value obtained from a power measurement chip.

FIG. 4 illustrates the principal steps of a first embodiment of a method of power factor correction 47 according to the present invention. At step 48, the controller 14 acquires the signed reactive power value from the power measurement chip 8. At step 49, the controller 14 calculates the reactance required to compensate for the reactive power value obtained. In step 50, the calculated reactance is connected across the load 2 or power line 4. The process 47 is repeated periodically at a rate which is determined by the programming of the controller 14 and, to some extent, by the clocking of the power measurement chip 8.

Because the process 47 obtains a signed reactive power value, it has the capability of detecting overcorrection of the power factor of the load 2, such as when the reactive power drawn by the load 2 decreases. It is not desirable for the process 47 to track variations in the reactive power drawn by the load 2 too closely. Thus, some averaging and comparing of current and past values of measured reactive power may be desirable. Additionally, it is not desirable to attempt to correct the power factor of the load 2 to precisely unity, because of undesirable resonance effects which can occur. It has been found that maximizing the power factor to about 0.95 is an optimum correction in the process 47.

Figure 5:
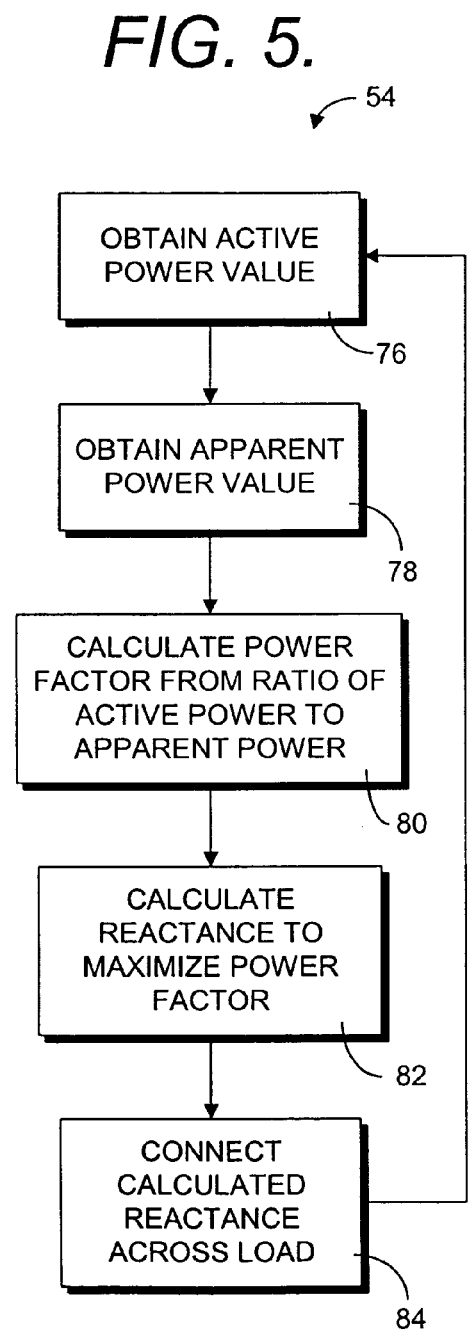
FIG. 5 is a flow diagram illustrating the principal process steps of a second embodiment of the present invention in which a power factor value is derived from values of active power and apparent power obtained from a second type of power measurement chip.
Figure 6:
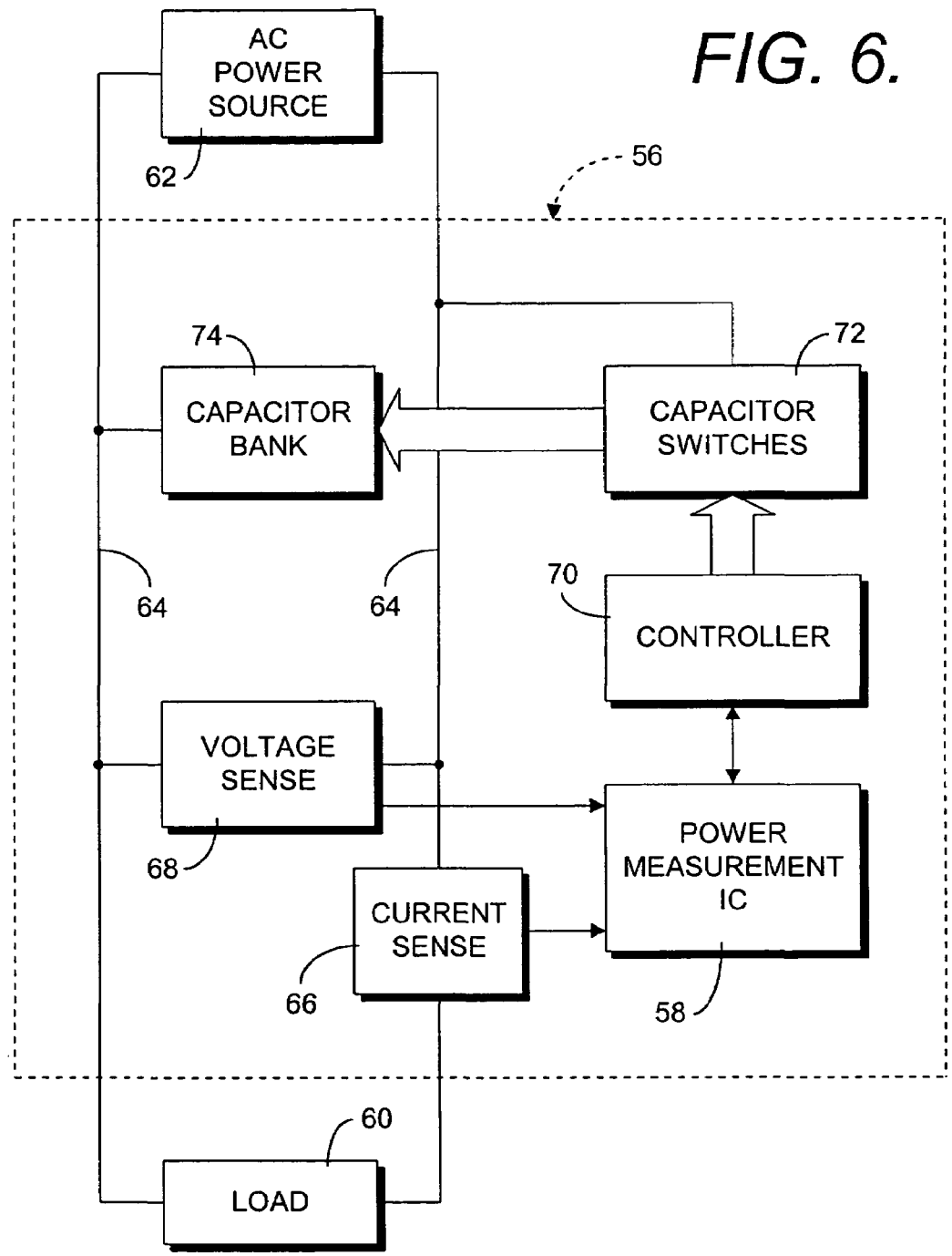
FIG. 6 is a block diagram illustrating a preferred configuration of the principal components of an automatic power factor correction system of the second embodiment of the present invention.

FIGS. 5 and 6 illustrate a power factor correction process 54 (FIG. 5) and apparatus 56 (FIG. 6) which form a second embodiment of the present invention. The process 54 and apparatus 56 are particularly adapted for use with a power measurement integrated circuit 58 which does not provide a signed reactive power value but which does provide values of active power and apparent power, from which a power factor value for a load 60 may be obtained. Such a chip 58 could be implemented by a model CS5460 manufactured by Cirrus Logic, Inc. Documentation for the CS5460 can be obtained from the website listed above.

Referring to FIG. 6, the apparatus 56 provides power factor correction for the load 60 which receives electrical power from an AC power source 62 by way of a power line 64. The apparatus 56 includes current sensing circuitry 66 and voltage sensing circuitry 68 which may be similar to the circuitry 10 and 12 of the apparatus 1. The circuitry 66 and 68 are coupled to the chip 58 by means of respective scaling and filtering circuitry (not shown). The chip 58 communicates with a controller 70, which may be similar to the controller 14. A set of capacitor switching elements 72 is coupled between the controller 70 and a bank of capacitors 74 which are connected on one side to one conductor of the power line 64. The switches 72 are connected to the other conductor of the power line 64 and complete circuits between selected ones of the capacitors 74 and the power line 64 when corresponding ones of the switches 72 are activated by the controller 70. The switches 72 and capacitors may be substantially similar to the switches 16 and capacitors 6.

The power measurement chip 58 periodically derives values of active power and apparent power, among other parameters, from current and voltage measurements made through the current and voltage sensing circuitry 66 and 68 and stores these values in particular registers within the chip 58. Referring to FIG. 5, the controller 70 is programmed to acquire the active power value from the chip 58 in step 76 of the process 54 and the apparent power value in step 78. In step 80, the controller 70 calculates a power factor value from the ratio of the active power value to the apparent power value. In step 82, the controller 70 calculates the combination of capacitors 74 required to substantially maximize the power factor value, to thereby compensate for the level of reactive power drawn by the load 60. As in the process 47 (FIG. 4), the objective of the process 54 is to achieve a power factor value of about 0.95. The controller 70 controls the connection of the required capacitors 74 across the power line 64, by way of the capacitor switches 72, in step 84. The illustrated process 54 is repeated in an endless loop, as long as the controller 70 and other components are active. Alternatively, the apparatus 56 could be interconnected to the load 60 in such a manner that the process 54 is only activated with the load 60 is electrically activated.

The particular power measurement chip 58 used in the apparatus 56 does not directly provide a signed value of reactive power drawn by the load 60. Thus, the chip 58 is not adapted to directly sense overcorrection of the power factor, such as when the level of reactive power decreases, as would occur if mechanical loading of an electrical motor were reduced. Although the chip 58 is capable of deriving parameters from which a signed level of reactive power could be determined or by comparing current parameters with previous parameters, the apparatus 56 is particularly configured so that such an indirect manner of determining a signed level of reactive power is not necessary.

As illustrated in FIG. 6, the current sensing circuitry 66 is connected in series with the load 60 in a circuit branch 86 which is connected in parallel with the power source 62 and any capacitors 74 connected across the power line 64. Because the current sensing circuitry 66 is on the load side of the capacitors 74, rather than on the source side, the current sensed by the circuitry 66 is only affected by the characteristics of the load 60 and not by the capacitors 74. Thus, the chip 58, in calculating a compensating reactance, simply calculates the combination of capacitors 74 needed to compensate for the currently measured power factor value of the load 60 with no assumption of a combination of capacitors 74 previously connected across the power line 64.

Although the automatic power factor correction apparatus 1 and 56 have been described and illustrated with the suggestion that they are housed independent of the loads 2 and 60, it is foreseen that apparatus 1 or 56 could be incorporated into individual loads 2 or 60, such as within individual appliances. Additionally, it is foreseen that the functions of the power measurement integrated circuit 8 and the controller 14 could be combined in a single integrated circuit. Similarly, the functions of the power measurement chip 58 and the controller 70 could be combined in a single integrated circuit. Such combinations are intended to be encompassed by the present invention.

It is to be understood that while certain forms of the present invention have been illustrated and described herein, it is not to be limited to the specific forms or arrangement of parts described and shown.

What is claimed and desired to secure by Letters Patent is:

1. A power factor correction apparatus for power factor correcting an electrical installation including a power line having coupled thereto a load drawing AC electrical power including a potentially variable level of reactive power, said apparatus comprising:

(a) power sensor circuitry coupled to said power line and operative to detect an electrical parameter of electrical power drawn by said load which indicates a level of reactive power drawn by said load, said power sensor circuitry including a power measurement integrated circuit coupled to said power line;

(b) a plurality of reactance elements;
(c) switching circuitry controllable to couple said reactance elements to said power line individually or in selected combinations; and
(d) a controller interfaced to said power sensor circuitry and said switching circuitry and operative, in response to said level of reactive power indicated by said electrical parameter, to cause said switching circuitry to couple an appropriate combination of said reactance elements to said power line to thereby minimize said level of reactive power indicated by said electrical parameter.

2. An apparatus as set forth in claim 1 wherein:
(a) said power measurement integrated circuit periodically determines a signed reactive power value from electrical power drawn by said load;
(b) said controller acquires said signed reactive power value from said power measurement integrated circuit; and
(c) said controller calculates said appropriate combination of said reactance elements from said signed reactive power value.

3. An apparatus as set forth in claim 1 wherein:
(a) said power measurement integrated circuit periodically determines an active power value and an apparent power value from electrical power drawn by said load;
(b) said controller acquires said active power value and said apparent power value from said power measurement integrated circuit;
(c) said controller calculates a power factor value for said load from a ratio of said active power value to said apparent power value; and
(d) said controller calculates said appropriate combination of reactance elements from said power factor value.

4. An apparatus as set forth in claim 1 wherein said reactance elements include:
(a) a plurality of capacitors.

5. An apparatus as set forth in claim 1 wherein said reactance elements include:
(a) a set of capacitors of capacitance values varying in powers of two from a minimum capacitance value to a maximum capacitance value.

6. An apparatus as set forth in claim 1 wherein said reactance elements include:
(a) a plurality of capacitors, each capacitor having a capacitance value which is a multiple of a base capacitance value; and
(b) said base capacitance value is that capacitance value which results in a reactance which draws substantially one ampere at a nominal line frequency and line voltage of said power line.

7. An apparatus as set forth in claim 1 wherein:
(a) said controller includes a digital port formed by a specific plurality of port terminals;
(b) said switching circuitry includes latching elements which couple each of said reactance elements to specific ones of said port terminals; and
(c) said controller causes selected ones of said reactance elements to be coupled to said power line by writing to said port a multiple bit binary word having a bit content corresponding to said selected ones of said reactance elements.

8. An apparatus as set forth in claim 1 wherein:
(a) said power sensor circuitry is coupled to said power line by being coupled to said load; and (b) said power measurement integrated circuit and said controller are activated only in response to electrical activation of said load from said power line.

9. A method for power factor correcting an electrical power installation including a power line having coupled thereto a load drawing AC electrical power including a potentially variable level of reactive power, said method employing reactance elements and comprising the steps of:
(a) automatically measuring an electrical parameter of power drawn by said load using power sensor circuitry coupled to said power line, said power sensor circuitry including a power measurement integrated circuit, said electrical parameter being capable of indicating a level of reactive power drawn by said load; and
(b) automatically coupling an appropriate combination of said reactance elements to said power line to thereby substantially minimize said level of reactive power indicated by said electrical parameter.

10. A method as set forth in claim 9 and including the steps of:
(a) said power measurement integrated circuit automatically measuring a signed reactive power value from electrical power drawn by said load;
(b) automatically obtaining said signed reactive power value from said power measurement integrated circuit; and
(c) automatically determining said appropriate combination of said reactance elements from said signed reactive power value.

11. A method as set forth in claim 9 and including the steps of:
(a) said power measurement integrated circuit automatically measuring an active power value and an apparent power value from electrical power drawn by said load;
(b) automatically obtaining said active power value and said apparent power value for said load from said power measurement integrated circuit;
(c) automatically calculating a power factor value for said load from a ratio of said active power value to said apparent power value; and
(d) automatically determining said appropriate combination of reactance elements from said power factor value.

12. A method as set forth in claim 9 wherein said coupling step includes the step of:
(a) coupling one or more of a set of capacitors to said power line as said appropriate combination of said reactance elements.

13. A method as set forth in claim 9 wherein said coupling step includes the step of:
(a) providing a set of capacitors having capacitance values varying in powers of two from a minimum capacitance value to a maximum capacitance value; and
(b) coupling one or more of said set of said capacitors to said power line as said appropriate combination of said reactance elements.

14. A method as set forth in claim 9 wherein said coupling step includes the step of:
(a) providing a set of capacitors to said power line, each capacitor having a capacitance value which is a multiple of a base capacitance value, and said base capacitance value being that capacitance value which results in a reactance which draws substantially one ampere at a selected nominal line frequency and a selected nominal line voltage of said power line; and (b) coupling one or more of said set of said capacitors to said power line as said appropriate combination of said reactance elements.

15. A method as set forth in claim 9 and including the steps of:
   (a) providing a controller including a digital port formed by a specific plurality of port terminals and switching circuitry including latching elements which couple each of said capacitors to specific ones of said port terminals; and
   (b) said controller effecting coupling of said appropriate combination of said capacitors to said power line by writing to said port a multiple bit binary word having a bit content corresponding to said appropriate combination of said capacitors.

16. A method as set forth in claim 9 and including the step of:
   (a) coupling said power sensor circuitry to said power line by way of said load; and
   (b) activating said power sensor circuitry, including said power measurement integrated circuit, only in response to electrical activation of said load from said power line.

17. A method for power factor correcting an electrical power installation including a power line having coupled thereto a load drawing AC electrical power including a potentially variable level of reactive power, said method employing reactance elements and comprising the steps of:
   (a) coupling a power measurement integrated circuit to said power line;
   (b) automatically measuring a signed reactive power value from electrical power drawn by said load by said power measurement integrated circuit;
   (c) automatically obtaining said signed reactive power value from said power measurement integrated circuit;
   (d) automatically determining an appropriate combination of said reactance elements to thereby substantially minimize said level of reactive power indicated by said signed reactive power value; and
   (e) automatically coupling said appropriate combination of said reactance elements to said power line to thereby power factor correct said power installation.

18. A method as set forth in claim 17 wherein said coupling step includes the step of:
   (a) coupling one or more of a set of capacitors to said power line as said appropriate combination of said reactance elements.

19. A method for power factor correcting an electrical power installation including a power line having coupled thereto a load drawing AC electrical power including a potentially variable level of reactive power, said method employing reactance elements and comprising the steps of:
   (a) coupling a power measurement integrated circuit to said power line;
   (b) automatically measuring an active power value and an apparent power value from electrical power drawn by said load by said power measurement integrated circuit;
   (c) automatically obtaining said active power value and said apparent power value from said power measurement integrated circuit;
   (d) automatically calculating a power factor value for said electrical power drawn by said load from a ratio of said active power value to said apparent power value;
   (e) automatically determining an appropriate combination of said reactance elements to thereby substantially maximize said power factor value; and
   (f) automatically coupling said appropriate combination of said reactance elements to said power line to thereby power factor correct said power installation.

20. A method as set forth in claim 19 wherein said coupling step includes the step of:
   (a) coupling one or more of a set of capacitors to said power line as said appropriate combination of said reactance elements.

\* \* \* \* \*